United States Patent [19]

King et al.

[11] Patent Number: 5,094,409

[45] Date of Patent: Mar. 10, 1992

[54] METHOD OF PROVIDING A LUNAR HABITAT FROM AN EXTERNAL TANK

[75] Inventors: Charles B. King, Hampton; Warren D. Hypes, Toano; Lisa C. Simonsen, Yorktown; Ansel J. Butterfield; John E. Nealy, both of Newport News; John B. Hall, Jr., Reston, all of Va.

[73] Assignees: The Bionetics Corporation, Hampton, Va.; The United States of America as represented by the Administrator of the National Aeronautics and Space Administration, Washington, D.C.

[21] Appl. No.: 520,193

[22] Filed: May 9, 1990

[51] Int. Cl.⁵ .............................................. B64G 1/10
[52] U.S. Cl. .............................. 244/158 R; 244/159; 52/79.4
[58] Field of Search .................. 244/2, 158 R, 158 A, 244/159, 163, 160, 161, 162, 172; 52/79.4, 79.5

[56] References Cited

U.S. PATENT DOCUMENTS

| 3,866,863 | 2/1975 | von Pragenau . | |
| 3,896,758 | 7/1975 | Di Battista | 244/158 R |
| 4,122,991 | 10/1978 | Johnston et al. . | |
| 4,132,373 | 1/1979 | Lang . | |
| 4,807,833 | 2/1989 | Pori . | |
| 4,964,597 | 10/1990 | Hijazi | 244/159 |

OTHER PUBLICATIONS

"Small Space Stations", Stehling, Aerospace Engineering, Sep. 1960, pp. 45-47.
"Space Flight", Flight International, Mar. 16, 1967, pp. 420-421.
"Space Resources and Space Settlements", NASA SP-428, Gerard O'Neill.

Primary Examiner—Galen Barefoot
Attorney, Agent, or Firm—Larson & Taylor

[57] ABSTRACT

A lunar habitat is provided by placing an external tank of an orbiter in a low Earth orbit where the hydrogen tank is separated from the intertank and oxygen tank which form a base structure. The base structure is then outfitted with an air lock, living quarters, a thermal control system, an environmental control and life support system, and a propulsion system. After the mounting of an outer sheath about the base structure to act as a micrometeoroid shield, the base structure is propelled to a soft landing on the moon. The sheath is mounted at a distance from the base structure to provide a space therebetween which is filled with regolith after landing. Conveniently, a space station is used to outfit the base structure. Various elements of the oxygen tank and intertank are used in outfitting.

12 Claims, 4 Drawing Sheets

FIG. I

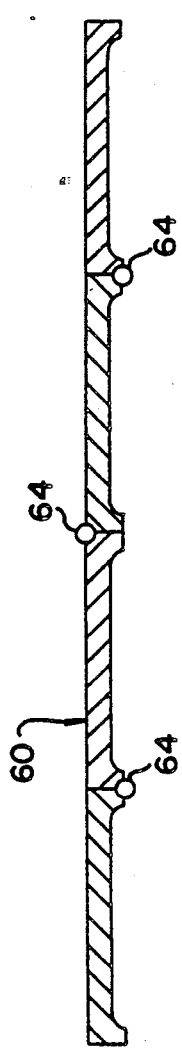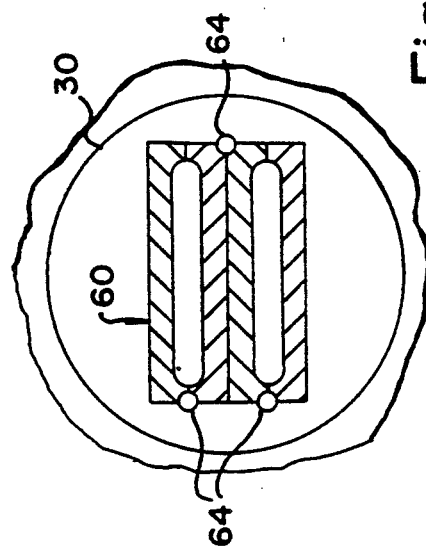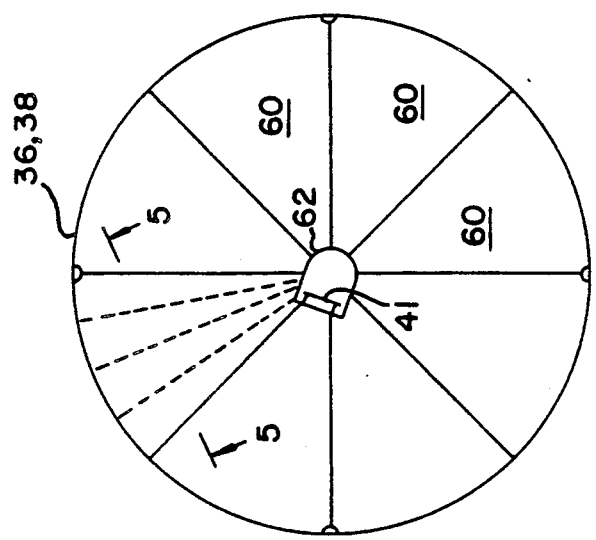

METHOD OF PROVIDING A LUNAR HABITAT FROM AN EXTERNAL TANK

The invention described herein was made in the performance of work under NASA Contract No. NAS1-18267 and is subject to the provisions of Section 305 of the National Aeronautics and Space Act of 1958, as amended (42 USC 2457).

FIELD OF THE INVENTION

The present invention relates generally to the provision of a lunar habitat, and more particularly to the use of the intertank and oxygen tank of an external tank to form a base structure of the lunar habitat.

BACKGROUND OF THE INVENTION

The National Space Transportation System external tank is a sacrificial structure used for approximately eight and one-half minutes during each space launch. This external tank provides liquid oxygen and liquid hydrogen to the orbiters main engines. The external tank is designed to carry sufficient propellant to place the external tank (attached to the orbiter) into low Earth orbit. Currently, the external tanks are jettisoned just prior to low Earth orbit insertion, and subsequently tumble and break up in the atmosphere before falling over open seas. The external tank consists of two pressure vessels, an oxygen tank and a hydrogen tank, joined by a cylindrical intertank structure.

In U.S. Pat. No. 4,807,833 (Pori), the configuring of a space vehicle fuel cell or tank in order to provide modular structural building components for a space station is disclosed. The configuring of the fuel cell includes the modifying of existing intertank structure to provide two concentric fuel storage tanks.

Other patents of general interest include: U.S. Pat. No. 3,866,863 (von Pragenau) which discloses a space vehicle using an external fuel cell; U.S. Pat. No. 4,132,373 (Lang) which discloses a manned space flight body comprising a cylindrical shell; and U.S. Pat. No. 4,122,991 (Johnston, et al.) which discloses a prepunched ribbon structure which is formed around an external fuel cell.

SUMMARY OF THE INVENTION

In accordance with the present invention, a lunar habitat is provided by the initial step of placing an external tank of an orbiter in a low Earth orbit. The hydrogen tank is then separated from the intertank and oxygen tank, which together form a base structure. While in orbit, this base structure is then outfitted with an air lock, living quarters, a thermal control system, an environmental control and life support system, and a propulsion system. In addition, a power system, a communications system, and a guidance, navigation and control system are preferably provided. An outer sheath is also mounted about the base structure to act as a micrometeoroid shield. Finally, the propulsion system is used to propel the base structure to a soft landing on the moon.

In a preferred embodiment of the invention, the sheath is mounted at a distance from the base structure to provide a space therebetween. Then, after landing on the lunar surface, the space is filled with regolith.

In the preferred embodiment, the base structure is moved to a higher Earth orbit before the outfitting step where a space station has been previously established. The base structure is then docked to the space station before the outfitting step. The docking step includes the berthing of the oxygen tank to an air lock joined to a resource node of the space station to provide access through a manhole at a forward tip of the oxygen tank. Then, a dedicated environmental control and life support (ECLS) module connected to the resource node supplies a habitable atmosphere to the interior of the oxygen tank during outfitting of the interior.

During the separating step, the oxygen tank is vented. In addition, the tumble valve system of the external tank is deactivated and the explosive charge of the range-safety system is removed from the external tank. If desired, the oxygen tank is moved to a higher Earth orbit after separation.

During the outfitting step, respective sandwich panel floorings are preferably attached to opposite longitudinal portions of the slosh baffle of the oxygen tank. The floorings are furnished in pie shaped pieces that fold for entry into the oxygen tank. The assembled floorings have a center access opening for astronauts and equipment to pass through. In addition, an existing door is utilized in the intertank, and the air lock is joined between this door and an aft manhole of the oxygen tank.

It is a feature of the present invention that the external tank from an orbiter is utilized, not wasted.

It is also a feature of the present invention that the structural integrity of the oxygen tank is not compromised by the addition of structural modifications for outfitting the existing tank.

It is a further feature of the present invention that the oxygen tank and intertank of the external tank are outfitted and used as a lunar habitat.

Other features and advantages of the present invention are stated in and are apparent from a detailed description of a presently preferred embodiment of the invention found hereinbelow.

BRIEF DESCRIPTION OF THE DRAWINGS

FIG. 4 is a schematic plan view of a panel flooring depicted in FIG. 3.

FIG. 5 is a cross-sectional elevation view of the panel flooring depicted in FIG. 4 taken along the line 5—5.

FIG. 6 is a cross-sectional elevation view of the panel flooring depicted in FIG. 5 in the folded position.

DETAILED DESCRIPTION OF THE PREFERRED EMBODIMENTS

Figure 1:
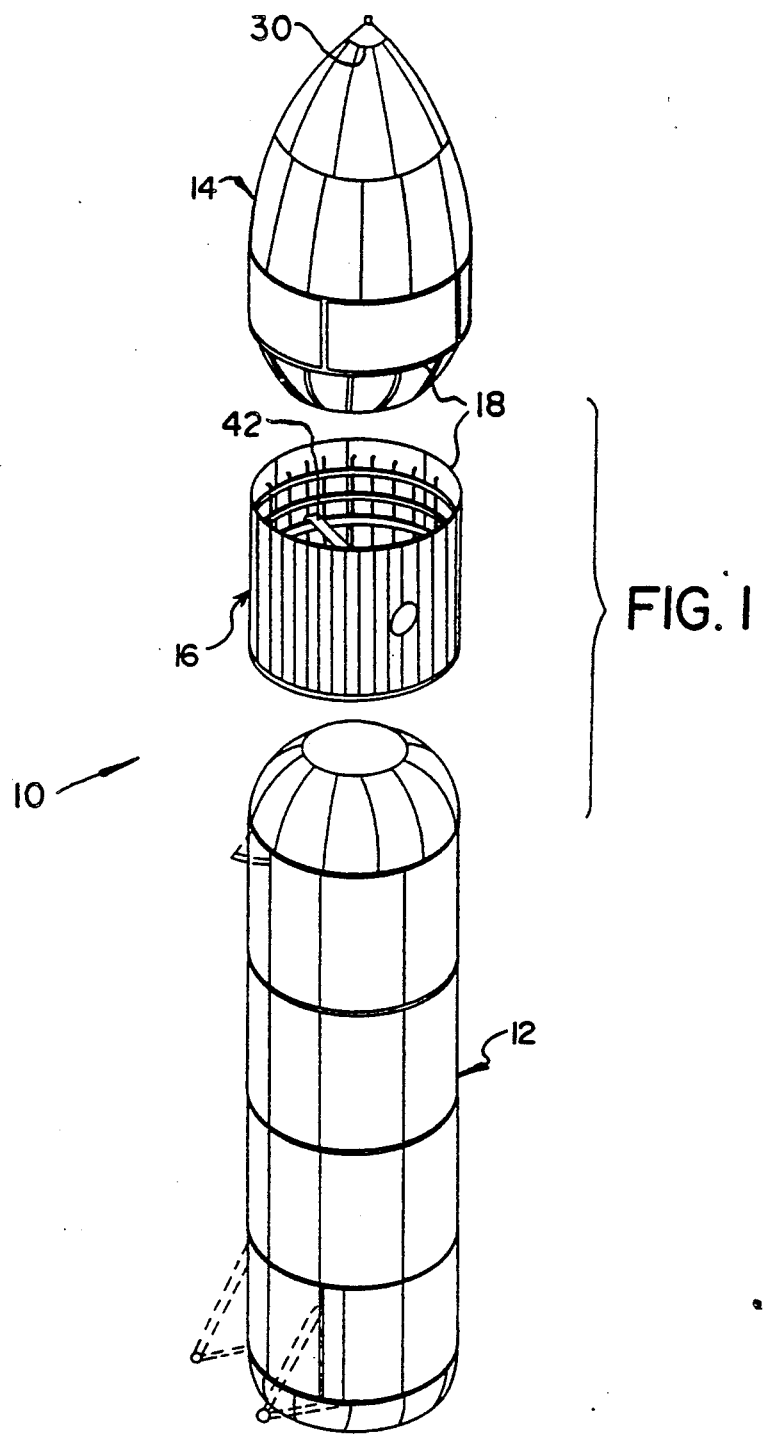
FIG. 1 is an exploded perspective view of an external tank from a National Space Transportation System.
Figure 2:
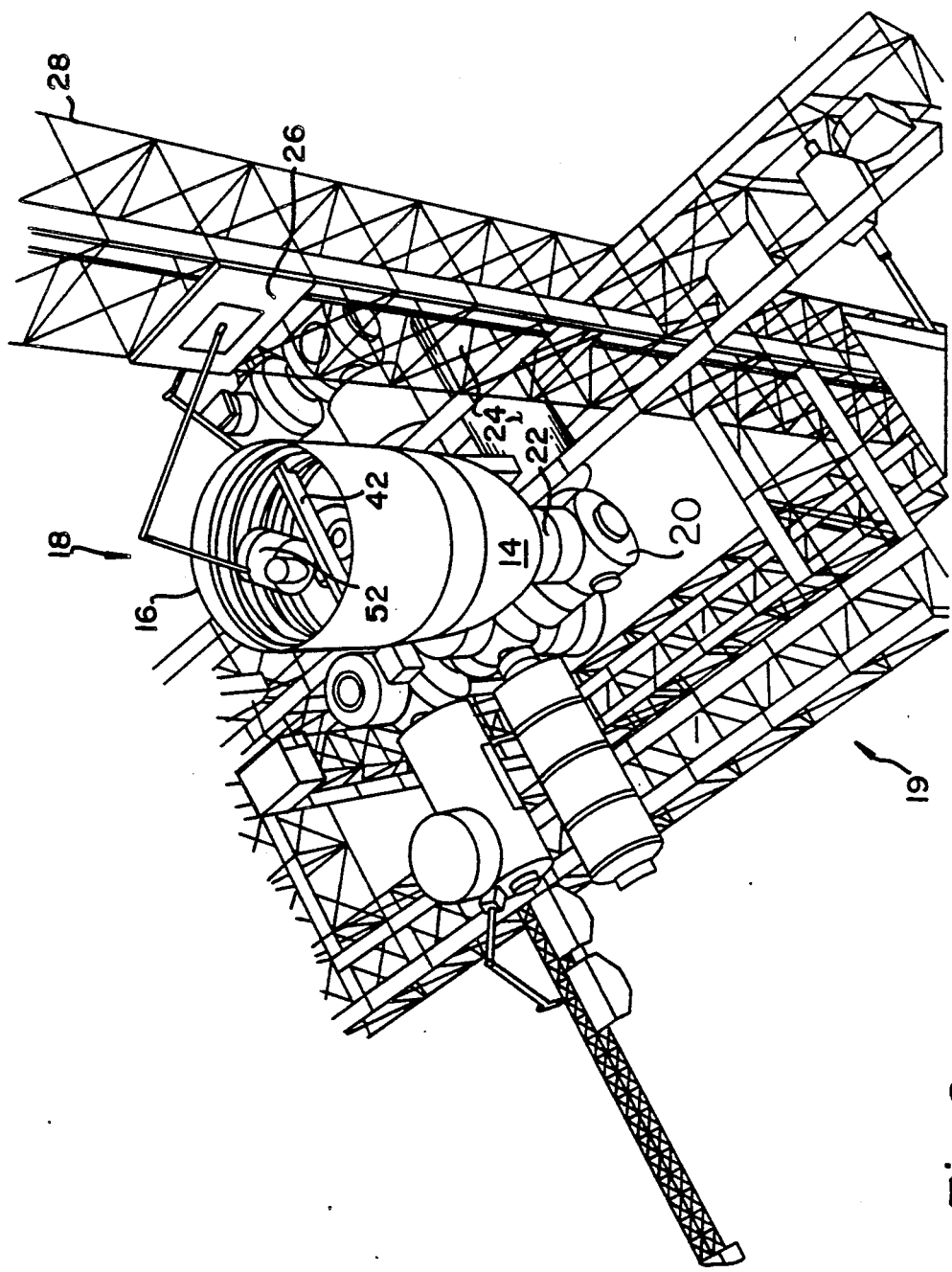
FIG. 2 is a perspective view of a base structure according to the present invention docked to a portion of a space station.

With reference now to the drawings in which like numerals represent like elements, a lunar habitat is provided as by the method described hereinbelow. Briefly, this method includes the placing of an external tank in orbit, safing of this external tank, separation of the hydrogen tank from the intertank and oxygen tank which form a base structure, and outfitting this base structure as a lunar habitat.

Initially, it should be appreciated that an external tank 10 consists of a hydrogen tank 12, an oxygen tank 14, and a cylindrical intertank 16. Liquid oxygen tank 14 is a butt fusion welded gas-type pressure vessel of aluminum alloys. Aluminum plates are shaped and chemically milled to form an ogive-shaped forward end joined to a cylinder, and the aft-tank end is closed with a modified ellipsoidal dome. Liquid oxygen tank 14 is equipped with a manhole 30 at the forward end as well as a manhole 32 in the aft hemispherical dome. There is also a 17 inch diameter port in the aft hemispherical dome. Liquid oxygen tank 14 is designed and hydrotested to assure safe flight operation at 172.3 kPa (25 psia), which is well above the internal pressure of 101.3 kPa (14.7 psia) intended for a lunar habitat.

Intertank 16 is a cylindrical structure of stringer stiffened panels joined to ring frames. A solid rocket booster beam extends across the diameter of intertank 16.

After being placed in low Earth orbit in conjunction with the launching of an orbiter or the like, external tank 10 is preferably stabilized in orbit during disassembly operations using a space station based orbital-maneuvering vehicle. Alternatively, a single launch of an orbiter is used to place external tank 10 in orbit where the orbiter astronauts then perform the disassembly operations. The disassembly operation includes the separation of hydrogen tank 12 from oxygen tank 14 and intertank 16 by extravehicular activity which takes place at an approximately 160 nautical mile altitude to insure that the foam-plastic-insulation debris meets atmospheric conditions and rapidly falls back to Earth.

Separation of hydrogen tank 12 from intertank 16 and oxygen tank 14 requires removal of 178 bolts. This separation process further requires: deactivating the tumble valve system, and then venting and purging the liquid oxygen tank and feed line; draining, venting and purging of the liquid hydrogen tank; and removing of the explosive charges of the range-safety system. However, liquid oxygen tank 14 and intertank 16 remain bolted together and form a base structure 18. The disassembly operations should not exceed twelve hours of elapsed EVA time, so that the orbiter astronauts launched with external tank 10 could perform the disassembly operations and then deliver base structure 18 together with the required subsystems to space station 19 in a single launch. Alternatively, astronauts from space station 19 with an orbital-maneuvering vehicle can perform the disassembly operations.

The orbital-maneuvering vehicle is also advantageously used to save hydrogen tank 12 by moving it to a higher orbital altitude as desired, or to destroy the tank by causing it to enter the Earth's atmosphere. In either event, base structure 18 is transported by the orbital-maneuvering vehicle to berth with a space station 19 which is conventionally located at an orbital altitude of approximately 250 nautical miles.

By design, space station 19 will have already been outfitted with a resource node 20, an air lock 22, and a dedicated environmental control and life support (ECLS) module 24, as well as a habitat area for the outfitment crew. Conveniently, base structure 18 is docked to space station 19 adjacent a mobile servicing center 26 provided on an adjacent keel 28. Resource node 20, air lock 22, and ECLS module 24 are in addition to the facilities of space station 19, and are committed to facilitate the assembly of the lunar habitat according to the present invention.

As shown, resource node 20 (which is attached at an uncommitted port of space station 19) permits berthing of base structure 18 to provide access to the interior of oxygen tank 14 through a manhole 30 provided at a forward tip of oxygen tank 14. Environmental control and life support module 24 is connected through resource node 20 to supply a habitable atmosphere to the interior of oxygen tank 14. This permits the astronauts to outfit oxygen tank 14 in a shirt-sleeve environment, thus minimizing the extravehicular activity required since most of the work can be accomplished through intravehicular activity. However, as explained subsequently, a micrometeoroid sheath must be added to exterior of base structure 18 as well as the installation of a propulsion system to intertank 16, all of which must be accomplished using extravehicular activity aided by a mobile servicing center 26 which is provided with robotic-end effectors.

It should be appreciated that current dimensional recommendations for a high-pressure space suit call for a design which will permit an astronaut to pass through a 36 inch diameter manhole or a 36 inch by 40 inch air lock opening of an orbiter. Thus, both air lock 22 and manhole 30 should meet these minimum requirements.

Brief conceptual design studies had been performed to provide estimates of the mass and volume requirements of the various systems and support structures essential for outfitting base structure 18 as a lunar habitat. Approximately 180 containers of various sizes and masses would be required for the internal structure, the environmental control and life support system, the thermal-control system, and a propulsion system; and approximately 70 additional containers would be required for the guidance, navigation and control, communications, and power systems.

Figure 3:
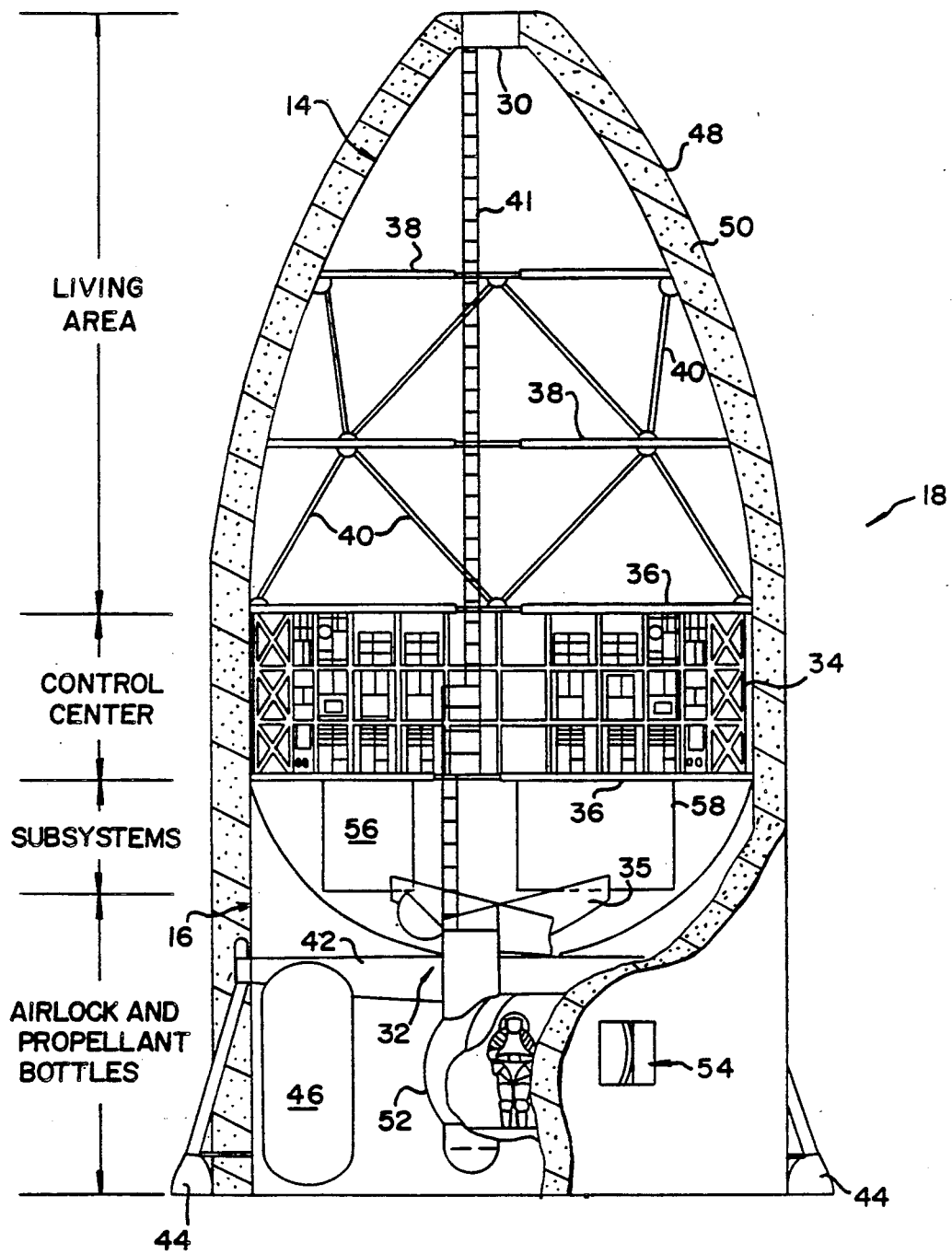
FIG. 3 is a schematic elevation view with portions broken away of the base structure used as a lunar habitat.

The outfitting process of liquid oxygen tank 14 is somewhat like building a ship in a bottle, and will consist of passing containers through manhole 30 for assembly or erection within the interior of oxygen tank 14. As shown in FIG. 3, oxygen tank 14 includes a slosh baffle 34 and vortex baffle 35 as a normal part of oxygen tank 14. Slosh baffle 34 thus provides a circular structural support to a sandwich panel floorings 36 attached to the respective longitudinal ends (top and bottom) of slosh baffle 34. Between panel floorings 36, a control center with electronic control and/or instrumentation is positioned on slosh baffle 34 which provides support shelving therefor. Preferably, two additional panel floorings 38 are installed in the upper portion of oxygen tank 14 which are supported by truss struts 40. Panel floorings 38 are substantially similar to panel floorings 36, but have a smaller diameter.

As shown in FIGS. 4-6, the panel flooring diameter of each panel flooring 36 and 38 is divided into eight separate pie shaped pieces 60. Each piece 60 is capable of being folded at hinges 64 to permit entry through manholes 30 and 32. Each assembled panel flooring 36 and 38 within oxygen tank 14 has a floor access opening 62. The size of the floor openings 62 is equal or greater than the manhole openings and permit objects passing through the manholes to pass between floors. A ladder 41 with an electrical tread lift extending through openings 62 then provides a redundant means for the astronauts and equipment to pass from floor to floor.

It should also be appreciated that equipment and supplies for outfitting base structure 18 to function as a lunar habitat could also be delivered to space station 19 by a suitable shuttle, such as Shuttle C. Shuttle C is a currently planned United States heavy-lift launch vehicle having a payload lift capacity of 68,039 kg (150,000 pounds). Sub-system components could then be delivered to space station 19 by the regular shuttle, Shuttle C, or another expendable launch vehicle. This would preferably be done on a just-in-time basis to minimize warehousing.

The propulsion system according to the present invention could make use of the planned improvements of the Centaur RL-10 thrusters which are designed for multiple restarting and throttling. With such engines, the propulsion system would also utilize ten cylindrical propellant tanks 46 (only one is shown) and sixteen externally mounted cylindrical tanks (not shown). These external tanks are jettisoned when emptied. An interconnecting manifold would feed four thrusters (only two of which are shown), which are mounted in a manner to apply the thrust to the ends of beam 42.

NASA studies and data have been used to determine that the proposed propulsion system is sufficient to move the outfitted base structure 18 from a low Earth orbit to a soft landing on the moon. Once landing is achieved, a small portion of the cryogenic propellant reserve would serve to supply the fuel cells of the lunar habitat during a post-landing self-test. After such a test, the lunar habitat would switch into a stand-by mode to await arrival of up to a twelve-man crew for up to a seventy day continuous stay before resupply is required. Although the flight sequence would be autonomous, man would have an interactive capability. The communication and guidance systems would be capable of receiving and implementing updates or modifications to any of the planned sequences.

It should be appreciated that the logistics of propellant transfer to a lower Earth orbit anticipate the availability of unmanned launch vehicles having a sufficient capacity (a minimum capacity of 30,000 kg or over 66,000 pounds) and being able to deliver the propellant just prior to launch of base structure 18 to the moon. The preferred mode for transporting such propellant to orbit is in plug-in assemblies or tanks that can be handled by a remote means. The external tanks to be attached to intertank 16 are prime candidates for such a configuration as they can subsequently be jettisoned. The internal tanks 46 attached to intertank 16 could also be configured for remote installation. However, it should be appreciated that these tanks will remain active as cryogenic reservoirs throughout the lunar missions.

As mentioned briefly above, a micrometeoroid sheath 48 is required to protect base structure 18. Sheath 48 is required because oxygen tank 14 is formed by a shell having walls which vary in thickness from 0.2 to 0.47 cm (0.08 to 0.186 inches) with over 90 percent of the vessel having walls of thickness 0.25 cm (0.1 inch) or greater. As with conventional micrometeoroid shield designs, sheath 48 is spaced some distance from base structure 18. Based on calculations, sheath 48 should be approximately 0.3 cm (0.118 inches) in thickness when made from aluminum.

It should further be appreciated that the spacing of sheath 48 from base structure 18 also affords an opportunity for increased radiation shielding for base structure 18 once it has been landed on the moon. In particular, the space between sheath 48 and base structure 18 is filled with lunar regolith or soil 50. Recent study showed that a 50 cm thickness of regolith should provide sufficient attenuation of the radiation resulting from large solar flares and galactic cosmic rays. Regolith 50 also provides additional thermal insulation. Sheath 48 is preferably assembled from gore sections which are readily transportable in the cargo bay in a shuttle or the like.

In Earth orbit, an air lock 52 is also preferably added to base structure 18 to connect manhole 32 to an access door 54 of intertank 16. Both air lock 52 and manhole 32 should also meet the same minimum requirements as air lock 22 and manhole 30. Air lock 52 is designed to provide egress for personnel once base structure 18 forms a lunar habitat on the moon. A second exit is preferably provided in air lock 52 to also provide access to the interior of intertank 16. Finally, a third exit from air lock 52 also allows long objects to be passed directly through air lock 52 during Earth orbit outfitting.

As indicated above, a thermal-control system 56 must be outfitted to base structure 18. Such a thermal-control system 56 has been conceptually designed in the art to actively remove an internal heat load of 20 kW. This includes the latent, metabolic sensible, and experiment-/equipment heat loads which are anticipated.

As part of thermal-control system 56, a heat-acquisition subsystem and air-temperature and humidity-control subsystem must be accommodated. The heat-acquisition subsystem includes the air-temperature and humidity-control subsystem and an internal flow transport loop therefor. The air-temperature and humidity-control subsystem provides humidity control, ventilation, and avionics fan cooling to the interior of oxygen tank 14. To make the task of installing the ventilation/avionics fan cooling system manageable, most of the ventilation lines are built into the flooring and connected to a centrally located distribution duct originating at the fan locations in the subsystems area identified in FIG. 3. Approximately two-thirds of the equipment and experiments is fan cooled while the other one-third is cooled with cold plates. Single phase pumped water loops acquire the heat load and provide the experiments with cold-plate cooling. The most difficult task in the installation of the acquisition subsystem is laying the acquisition fluid lines. Most of the equipment acquiring cold-plate cooling will have pre-assembled components so that all that will need to be done is to plug them into the appropriate fluid line.

The internal heat load is transferred to an external transport loop via bus-heat exchangers. The bus-heat exchangers are located near the seventeen inch diameter port (near manhole 32) where the internal lines pass through the port closure of oxygen tank 14. A heat-pump system is then used to raise the final rejection temperature of the radiators well above the sink temperature during the hottest portions of the lunar day and a bypass is used during the lunar night. The transport lines penetrate the intertank structure through the liquid oxygen feed line aperture to connect with the radiators. The radiators are preferably two-sided with a total rejection area of 67 $m^2$ (720 $ft^2$) and are oriented parallel to the plane of the solar ecliptic.

All of the external system components except the radiator panels and heat pump fit inside base structure 18 for transport to the lunar surface. The radiator panels are preferably strapped to the outside of sheath 48 and the heat-pump system is mounted within intertank 16 where it remains protected for use on the lunar surface. The major task involved with construction of the transport and rejection subsystems are the installation of the vapor and liquid transport line to and from the radiator panels, and the erected orientation of the radiator panels. These panels would be approximately 15 m (50 feet) from the lunar habitat.

An environmental control and life support (ECLS) system 58 is also provided. ECLS system 58 is typical of physicochemical regenerative systems currently envisioned for Earth orbiting space stations and manned lunar bases and well known to those of ordinary skill in the art.

The conversion of liquid oxygen tank 14 and intertank 16 as a base structure 18 to a lunar habitat thus requires carefully planned and executed steps. The process preferably starts by outfitting and testing all of the systems and then disassembly of the systems on Earth for packaging in containers for later reassembly in Earth orbit. After external tank 10 is delivered to lower Earth orbit, liquid oxygen tank 14 and intertank unit 16 are separated from hydrogen tank 12 and transported to a space station 19 for berthing and complete reassembly of the systems and components. Upon completion of a systems' check-out, base structure 18 is fueled and propelled for an unmanned soft landing on the lunar surface where a self-check process would then occur. After the arrival of a manned cargo lander, a crew would assemble the thermal and possible auxiliary power systems and add regolith for radiation shielding prior to occupancy of the lunar habitat.

The structural and subsystems components of base structure 18 would preferably be installed and integrated on Earth. Oxygen tank 14 could be scarred to simplify the installation of support structures. Additionally, the erectable floor panels 36 and 38 could also be scarred to receive all of the subsystem components (associated wiring, ventilation ducts, etc.).

With the addition of ECLS module 24, air lock 22, and resource node 20 to space station 19, space station 19 thus provides berthing for base structure 18 so that internal outfitting takes place in a shirt-sleeve environment. The use of mobile servicing center 26 facilitates positioning of hardware components on the exterior of base structure 18. An orbital maneuvering vehicle based on the space station 19 is used to berth base structure 18 and to transport components from expendable launch vehicles to base structure 18.

After soft landing, base structure 18 may not have vertical alignment due to the topography of the lunar terrain. Adjustable foot pads should thus be provided to correct this situation. After this is done, the thermal radiator panels attached to the exterior of sheath 48 are separated and erected approximately 50 feet from the habitat. Interconnecting flexible lines would be assembled between the heat-pump intertank 16 and this radiator. Regolith would then be added to fill the cavity formed between sheath 48 and base structure 18 to provide further radiation protection. The filling process would require a conveyer to lift the regolith from the lunar surface to the top opening in sheath 48.

A manned cargo lunar lander will then provide man with life-support items and additional subsystem components as required. A re-supply cycle of seventy days for twelve men is one of the design criterion.

Additional details of a proposed system is disclosed in "A Concept For Using The External Tank from a National Space Transportation System (NSTS) For A Lunar Habitat", by C. B. King et al. which was presented at the Ninth Biennial Princeton Conference on Space Manufacturing held in Princeton, N.J. on May 10-13, 1989. This paper is herein incorporated by reference.

While the present invention has been described with respect to an exemplary embodiment thereof, it will be understood by those of ordinary skill in the art that variations and modifications can be effected within the scope and spirit of the invention.

We claim:

1. A method for providing a lunar habitat comprising the steps of:
    placing an external tank of an orbiter in a low Earth orbit, the external tank comprising a hydrogen tank, an oxygen tank, and an intertank which connects the hydrogen and oxygen tanks together;
    separating the hydrogen tank from the intertank and oxygen tank which together form a base structure;
    outfitting the base structure with an air lock, living quarters, a thermal control system, an environmental and life support system, and a propulsion system;
    mounting an outer sheath about the base structure to act as a micrometeoroid shield; and
    propelling the base structure to a soft landing on the moon using the outfitted propulsion system.

2. A method for providing a lunar habitat as claimed in claim 1 wherein said mounting step mounts the sheath at a distance from the base structure to provide a space therebetween; and further including the step of filling the space with regolith after landing.

3. A method for providing a lunar habitat as claimed in claim 1 and further including the step of moving the base structure to a higher Earth orbit before the outfitting step.

4. A method for providing a lunar habitat as claimed in claim 3 wherein a space station is provided at the higher Earth orbit; and further including the step of docking the base structure to the space station before the outfitting step.

5. A method for providing a lunar habitat as claimed in claim 4 wherein the oxygen tank is provided with a manhole at a forward tip thereof and the space station is provided with a resource node; and wherein the docking step includes the berthing of the oxygen tank to the resource node to provide access through the manhole to the interior of the oxygen tank.

6. A method for providing a lunar habitat as claimed in claim 5 wherein the space station includes an environmental control and life support module connected to the resource node; and further including the step of supplying a habitable atmosphere to the interior of the oxygen tank from the module during outfitting of the interior.

7. A method for providing a lunar habitat as claimed in claim 1 wherein said separating step includes the step of venting the oxygen tank.

8. A method for providing a lunar habitat as claimed in claim 7 wherein the separating step includes deactivation of a tumble valve system of the external tank, and removing of an explosive charge of a range-safety system from the external tank.

9. A method for providing a lunar habitat as claimed in claim 1 wherein the separating step further includes the step of moving the hydrogen tank to a higher Earth orbit.

10. A method for providing a lunar habitat as claimed in claim 1 wherein the outfitting step includes the step of attaching sandwich panel flooring to opposite longitudinal portions of a slosh baffle of the oxygen tank.

11. A method for providing a lunar habitat as claimed in claim 1 wherein panel flooring for a floor is comprised of a plurality of foldable pieces, and wherein said outfitting step includes the steps of folding each piece, passing each piece through a manhole of the oxygen tank, and then unfolding each piece.

12. A method for providing a lunar habitat as claimed in claim 1 wherein said outfitting step includes the steps of providing a door in the intertank and joining the air lock between the door in the intertank and an aft manhole of the oxygen tank.

* * * * *